United States Patent
Lee et al.

(10) Patent No.: US 7,815,956 B2
(45) Date of Patent: *Oct. 19, 2010

(54) USE OF ERYTHRITOL AND D-TAGATOSE IN DIET OR REDUCED-CALORIE BEVERAGES AND FOOD PRODUCTS

(75) Inventors: Thomas Lee, Scarsdale, NY (US); Greg Radko, Yonkers, NY (US); Hang Chen, White Plains, NY (US); Pei K. Chang, Cortlandt Manor, NY (US)

(73) Assignee: PepsiCo, Purchase, NY (US)

( * ) Notice: Subject to any disclaimer, the term of this patent is extended or adjusted under 35 U.S.C. 154(b) by 556 days.

This patent is subject to a terminal disclaimer.

(21) Appl. No.: 11/538,303

(22) Filed: Oct. 3, 2006

(65) Prior Publication Data

US 2007/0082106 A1  Apr. 12, 2007

Related U.S. Application Data

(63) Continuation-in-part of application No. 10/127,455, filed on Apr. 23, 2002, now Pat. No. 7,579,032, and a continuation-in-part of application No. 10/127,473, filed on Apr. 23, 2002, now abandoned, which is a continuation-in-part of application No. 09/845,281, filed on May 1, 2001, now abandoned.

(60) Provisional application No. 60/334,770, filed on Oct. 31, 2001, provisional application No. 60/287,215, filed on Apr. 27, 2001.

(51) Int. Cl.
   *A23L 1/236* (2006.01)
(52) U.S. Cl. ........................ 426/548; 426/477; 426/569; 426/590
(58) Field of Classification Search ................ 426/474, 426/477, 548, 569, 590
   See application file for complete search history.

(56) References Cited

U.S. PATENT DOCUMENTS

| | | | |
|---|---|---|---|
| 3,460,713 A | 8/1969 | Cornelius | |
| 3,619,205 A | 11/1971 | Le Van et al. | |
| 3,647,472 A | 3/1972 | Speech et al. | |
| 3,826,829 A | 7/1974 | Marulich | |
| 4,262,032 A | 4/1981 | Levin | |
| 4,452,824 A | 6/1984 | Cole et al. | |
| 4,619,833 A | 10/1986 | Anderson | |
| 4,626,441 A | 12/1986 | Wolkstein | |
| 4,748,033 A | 5/1988 | Syfert et al. | |
| 4,760,138 A | 7/1988 | So et al. | |
| 4,770,889 A | 9/1988 | Sakai et al. | |
| 4,786,722 A | 11/1988 | Zehner | |
| 4,790,999 A | 12/1988 | Ashmont et al. | |
| 4,808,428 A | 2/1989 | Forsstrom et al. | |
| 4,810,516 A | 3/1989 | Kong-Chan | |
| 4,902,525 A * | 2/1990 | Kondou | ........................ 426/548 |
| 4,956,191 A | 9/1990 | Ueda et al. | |
| 4,963,382 A | 10/1990 | Arena et al. | |
| 4,971,797 A | 11/1990 | Cherukuri et al. | |
| 4,986,994 A | 1/1991 | Baccus, Jr. | |
| 5,002,612 A | 3/1991 | Beadle et al. | |
| 5,017,400 A | 5/1991 | Olinger et al. | |
| 5,041,541 A | 8/1991 | Mazur | |
| RE033,719 E | 10/1991 | Levin | |
| 5,064,672 A | 11/1991 | Mazur | |
| 5,069,924 A | 12/1991 | Baccus, Jr. | |
| 5,078,796 A | 1/1992 | Beadle et al. | |
| 5,103,649 A | 4/1992 | Kieffer | |
| 5,106,967 A | 4/1992 | Mazur | |
| 5,120,550 A | 6/1992 | Van der Schueren | |
| 5,226,450 A | 7/1993 | Lambourn | |
| 5,244,690 A | 9/1993 | Van der Schueren et al. | |
| 5,273,771 A | 12/1993 | Rapaille et al. | |
| 5,275,835 A | 1/1994 | Masterson et al. | |
| 5,380,541 A | 1/1995 | Beyts et al. | |
| 5,399,365 A | 3/1995 | Yatka et al. | |
| 5,468,734 A | 11/1995 | Seri et al. | |
| 5,478,587 A | 12/1995 | Mingione | |
| 5,516,763 A | 5/1996 | Heikkila et al. | |
| 5,518,754 A | 5/1996 | Miller et al. | |

(Continued)

FOREIGN PATENT DOCUMENTS

| | | |
|---|---|---|
| CA | 2309503 | 12/2000 |
| EP | 0009325 | 4/1980 |
| EP | 0236288 | 9/1987 |
| EP | 0257626 | 3/1988 |
| EP | 0287095 | 10/1988 |
| EP | 0287957 | 10/1988 |
| EP | 0304915 | 3/1989 |
| EP | 0325790 | 8/1989 |
| EP | 0511761 | 11/1992 |
| EP | 0552894 | 7/1993 |

(Continued)

OTHER PUBLICATIONS

H. Roper et al., "Erythritol, a New Raw Material for Food and Non-food Applications", Starch, vol. 45, pp. 400-405 (1993).
CA Selects: Artificial Sweeteners, abstract no. 136:69093b, issue 4, p. 1 (2002).
Beck, (in "Low Calorie and Special Dietary Foods", B.K. Dwivedi, ed., CRC Press Inc., Florida, pp. 61-114 (1978)).

(Continued)

*Primary Examiner*—Leslie Wong
(74) *Attorney, Agent, or Firm*—Banner & Witcoff, Ltd.

(57) ABSTRACT

A combination of one or more non-nutritive sweeteners, a sugar alcohol and D-tagatose are included in a reduced-calorie beverage or food product to achieve a taste substantially similar to that of a full-calorie beverage or food product. The combination is suitable for use in reduced-calorie frozen carbonated beverages. Preferably, the one or more non-nutritive sweeteners include one or more steviosides, a Stevia glycoside, a derivative of a Stevia glycoside, a glycoside of steviol, or a Lo Han Guo extract.

23 Claims, No Drawings

U.S. PATENT DOCUMENTS

| | | | |
|---|---|---|---|
| 5,527,554 A | 6/1996 | Olinger et al. | |
| 5,532,022 A | 7/1996 | Miller et al. | |
| 5,585,480 A | 12/1996 | Vogel et al. | |
| 5,665,406 A | 9/1997 | Reed et al. | |
| 5,667,573 A | 9/1997 | Kondou | |
| 5,672,589 A | 9/1997 | Heikkila et al. | |
| 5,700,514 A | 12/1997 | Gonze et al. | |
| 5,706,661 A | 1/1998 | Frank | |
| 5,736,185 A | 4/1998 | Kohno et al. | |
| 5,743,097 A | 4/1998 | Frank | |
| 5,806,550 A | 9/1998 | Frank | |
| 5,811,271 A | 9/1998 | Izumori et al. | |
| 5,853,785 A | 12/1998 | Nayyar et al. | |
| 5,912,030 A * | 6/1999 | Huzinec et al. | 426/3 |
| 5,916,606 A | 6/1999 | Record et al. | |
| 5,973,212 A | 10/1999 | De Sadeleer et al. | |
| 6,010,734 A | 1/2000 | Whelan et al. | |
| 6,045,850 A | 4/2000 | Kondou | |
| 6,048,567 A | 4/2000 | Villagran et al. | |
| 6,066,345 A * | 5/2000 | de Cock | 426/106 |
| 6,071,500 A | 6/2000 | Thistle | |
| 6,083,527 A | 7/2000 | Thistle | |
| 6,129,943 A | 10/2000 | Zeller et al. | |
| 6,143,345 A | 11/2000 | Gonze et al. | |
| 6,177,064 B1 | 1/2001 | de Troostembergh et al. | |
| 6,189,745 B1 | 2/2001 | Frank | |
| 6,432,464 B1 | 8/2002 | Andersen et al. | |
| 6,456,460 B1 | 9/2002 | Connolly et al. | |
| 6,468,576 B1 | 10/2002 | Sher et al. | |
| 6,475,540 B1 | 11/2002 | Howling et al. | |
| 6,716,462 B2 * | 4/2004 | Prosise et al. | 426/72 |
| 6,749,879 B2 | 6/2004 | Broz | |
| 7,579,032 B2 | 8/2009 | Lee et al. | |
| 2002/0001656 A1 | 1/2002 | Mason et al. | |
| 2002/0009530 A1 | 1/2002 | DuBois et al. | |
| 2002/0136803 A1 | 9/2002 | Stefandl | |
| 2002/0187232 A1 | 12/2002 | Lee et al. | |
| 2002/0197371 A1 | 12/2002 | Lee et al. | |
| 2002/0197376 A1 | 12/2002 | Broz | |

FOREIGN PATENT DOCUMENTS

| | | |
|---|---|---|
| EP | 0560284 | 9/1993 |
| EP | 0772977 | 5/1997 |
| EP | 0560284 | 7/1997 |
| EP | 0941668 | 9/1999 |
| EP | 0965277 | 12/1999 |
| EP | 0966952 | 12/1999 |
| EP | 1048671 | 11/2000 |
| EP | 0709463 | 3/2001 |
| EP | 0717047 | 5/2001 |
| EP | 0792589 | 10/2001 |
| EP | 1210880 | 6/2002 |
| EP | 0759273 | 7/2002 |
| FR | 2778822 | 11/1999 |
| GB | 2093677 | 9/1982 |
| JP | 59198942 | 11/1984 |
| JP | 59198943 | 11/1984 |
| JP | 602151 | 1/1985 |
| JP | 1265852 | 10/1989 |
| JP | 328180 | 4/1991 |
| JP | 697980 | 12/1994 |
| JP | 74167 | 1/1995 |
| JP | 775524 | 3/1995 |
| JP | 7506974 | 8/1995 |
| JP | 7274829 | 10/1995 |
| JP | 9224588 | 9/1997 |
| JP | 09322744 | 12/1997 |
| JP | 10117763 | 5/1998 |
| JP | 10136952 | 5/1998 |
| JP | 10136953 | 5/1998 |
| JP | 11187819 | 7/1999 |
| JP | 11346708 | 12/1999 |
| JP | 200032919 | 2/2000 |
| JP | 200037178 | 2/2000 |
| WO | 9722263 | 6/1997 |
| WO | 9816120 | 4/1998 |
| WO | 9930577 | 6/1999 |
| WO | 9930578 | 6/1999 |
| WO | 9934689 | 7/1999 |
| WO | 9943217 | 9/1999 |
| WO | 0042865 | 7/2000 |
| WO | 0128357 | 4/2001 |
| WO | 02085130 | 10/2002 |
| WO | 02087358 | 11/2002 |
| WO | 02087359 | 11/2002 |

OTHER PUBLICATIONS

J.A. Van Velthuijsen, et al., "Lactitol: A New Reduced-Calorie Sweetener", Alternative Sweeteners, 2d ed., L.O'B Nabors and R.C. Gelardi, eds., Marcel Dekker, Inc., New York, pp. 283-298 (1991).

J. Goossens, et al., "Nutritive Properties and Applications of Erythritol: A Unique Combination", Advanced in Sweeteners, T.H. Grenby, ed., Blackie Academic and Professional, London, pp. 150-186 (1996).

"Blending the Taste Sensation", Liquid Foods Int'l, vol. 3, No. 1, p. 31 (1999).

G.R. Shore, et al., "Taste and Mouthfeel in Low Calorie Soft Drinks", Contribution of Low- and Non-Volatile Materials to Flavor, W. Pickenhagen, ed., Allured Pub. Corp., pp. 119-123 (1996).

* cited by examiner

US 7,815,956 B2

USE OF ERYTHRITOL AND D-TAGATOSE IN DIET OR REDUCED-CALORIE BEVERAGES AND FOOD PRODUCTS

This application is a continuation-in-part of U.S. application Ser. No. 10/127,455, filed Apr. 23, 2002, now U.S. Pat. No. 7,579,032 and is a continuation-in-part of U.S. application Ser. No. 10/127,473, filed Apr. 23, 2002, now abandoned. U.S. application Ser. No. 10/127,455, filed Apr. 23, 2002, now U.S. Pat. No. 7,579,032, claims benefit of U.S. application Ser. No. 09/845,281, filed May 1, 2001, now abandoned, which claims the benefit of U.S. Provisional Application No. 60/334,770, filed Oct. 31, 2001. U.S. application Ser. No. 10/127,473, filed Apr. 23, 2002, now abandoned claims benefit of U.S. application Ser. No. 09/845,281, filed May 1, 2001, now abandoned, which claims the benefit of U.S. Provisional Application Nos. 60/287,215, filed April 27, 2001 and 60/334,770, filed Oct. 31, 2001. The disclosures of each of the applications in this paragraph are expressly incorporated by reference herein.

TECHNICAL FIELD

This invention relates to the use of a combination of a sugar alcohol and D-tagatose in a variety of zero- or low-calorie beverages and food products. This invention more particularly relates to a method of improving the taste of zero- or low-calorie beverages and food products, i.e., achieving a taste similar to that of a full-calorie beverage or food product, by including a blend of non-nutritive sweeteners, a sugar alcohol and D-tagatose in a zero- or low-calorie beverage or food product and relates to the resulting food products. This invention also relates to the use of a combination of a sugar alcohol and D-tagatose to achieve a high quality zero- or low-calorie frozen carbonated beverage. This invention further relates to beverages and food products which include both a sugar alcohol and D-tagatose.

BACKGROUND OF THE INVENTION

Reduced-calorie beverages and food products are very popular. Such products typically contain, singularly or in blends, non-nutritive sweeteners such as aspartame, acesulfame-K, saccharin, sucralose, neotame and cyclamate. While consumers do not have to worry about calories, non-nutritive sweeteners are known to impart a taste different from that of full-calorie counterparts. So-called "diet taste" is commonly described as slow onset but lingering sweetness accompanied with a bitter and/or metallic undesirable aftertaste and a watery mouthfeel. Due to the greatly reduced sugar solid content, reduced-calorie drinks also lack the body and/or thickness perception associated with full-calorie drinks. G. R. Shore, et al., "Taste and Mouthfeel in Low Calorie Soft Drinks", Contribution of Low- and Non-Volatile Materials to the Flavor of Foods, W. Pickenhagen, ed., Allured Publishing Corp., pp. 119-123 (1996). The watery mouthfeel and/or metallic undesirable aftertaste can be particularly severe in diet and zero-calorie beverages.

Reduced-calorie, low-calorie and zero-calorie beverages and food products with tastes similar to those of full-calorie products are very desirable and have been sought after for quite some time. Currently, however, methods of improving taste have fallen short of achieving a taste similar to full-calorie products. Consequently, there is a need for reduced-calorie beverages and foods having a taste similar to full-calorie products.

In addition, further problems arise when attempting to achieve reduced-calorie or diet frozen carbonated beverages (FCBs), which are semi-frozen carbonated drinks dispensed from a FCB dispenser. Such beverages require bulk solutes to stabilize small ice crystals and to trap carbon dioxide for a good taste and a smooth texture. The most commonly employed bulk solute is sugar. However, sugar is caloric and is therefore not suitable for the formulation of zero- or low-calorie FCBs. Sugar alcohols, which are known to mimic the bulk properties of ordinary sugars and have fewer calories, also are less sweet and most have undesirable gastrointestinal effects when ingested at comparable levels to sugars. Thus, making diet FCBs has been very difficult due to the need for both bulk solutes and zero or low calories.

SUMMARY OF THE INVENTION

In one embodiment, a reduced calorie beverage is provided. The beverage contains a non-nutritive sweetener, erythritol and D-tagatose. In certain embodiments, the non-nutritive sweetener comprises one or more steviosides. In various aspects of the invention, the one or more steviosides are selected from the group consisting of Stevioside, Rebaudioside A, Rebaudioside B, Rebaudioside C, Dulcoside A, Rubusoside, Steviolbioside, transglucosylation derivatives thereof, Stevia extract, and combinations thereof. In certain embodiments the steviosides comprises a Stevia extract.

In another embodiment, the non-nutritive sweetener is a Lo Han Guo extract. In particular embodiments, the Lo Han Guo extract contains one or more of the following glycosides: Mogroside IV, Mogroside V, Siamenoside 1, 11-Oxo-mogroside V. Any one or a combination of the above glycosides from the Lo Han Guo plant may be used as a non-nutritive sweetener. In one embodiment, an extract from Lo Han Guo is used.

In another embodiment, a reduced calorie beverage is provided. The beverage contains a non-nutritive sweetener, erythritol and D-tagatose. The non-nutritive sweetener includes one or more steviosides.

In another embodiment, a reduced calorie beverage syrup or concentrate is provided. The beverage contains a non-nutritive sweetener, erythritol and D-tagatose. The non-nutritive sweetener includes one or more steviosides.

This invention is directed to a method of improving the taste of a diet beverage comprising the step of including in the diet beverage (a) at least one and preferably a blend of non-nutritive sweeteners, (b) a sugar alcohol and (c) D-tagatose. According to certain preferred embodiments of the present invention, the beverage is a soft drink such as a cola or lemon-lime soft drink, a fountain beverage, a frozen ready-to-drink beverage, a coffee beverage, a tea beverage, a powdered soft drink, a liquid concentrate, a flavored water, enhanced water, a fruit juice or a fruit juice flavored drink, a sport drink or an alcoholic drink.

The present invention is also directed to a method of improving the taste of a diet food product comprising the step of including in the diet food product (a) at least one and preferably a blend of non-nutritive sweeteners, (b) a sugar alcohol and (c) D-tagatose. According to certain preferred embodiments of the present invention, the food product is a confection, dairy product, gelatin, pudding, cake mix, cereal or cereal-based product or baked good.

This invention is further directed to a method of making a diet frozen carbonated beverage comprising the step of combining (a) at least one and preferably a blend of non-nutritive sweeteners, (b) a sugar alcohol and (c) D-tagatose. Additionally, the invention is directed to a diet frozen carbonated beverage comprising (a) at least one and preferably a blend of non-nutritive sweeteners, (b) a sugar alcohol and (c) D-tagatose.

According to certain preferred embodiments of the present invention, the non-nutritive sweeteners are selected from aspartame, acesulfame salts, saccharins, cyclamates, sucralose, alitame, neotame, steviosides, glycyrrhizin, Lo Han Guo, neohesperidin dihydrochalcone, monatin, monellin, thaumatin, and brazzein, and the sugar alcohol is selected from sorbitol, mannitol, lactitol, maltitol, xylitol, erythritol and combinations thereof.

The present invention is also directed to diet beverages and food products which include (a) at least one and preferably a blend of non-nutritive sweeteners, (b) a sugar alcohol and (c) D-tagatose.

This invention is also directed to diet or reduced-calorie beverages sweetened with a sugar alcohol, D-tagatose and at least one nutritive sweetener. In certain preferred embodiments, the at least one nutritive sweetener is selected from fructose, sucrose, dextrose, maltose, trehalose, rhamnose, corn syrups and fructo-oligosaccharides.

In preferred embodiments of the present invention, erythritol is employed in an amount of about 0.1% to about 3.5% based on finished beverage weight and D-tagatose is employed in an amount of about 0.1% to about 1.0% based on finished beverage weight.

The diet or reduced-calorie beverages of the present invention can be selected from soft drinks, fountain beverages, frozen ready-to-drink beverages, coffee beverages, tea beverages, powdered soft drinks, liquid concentrates, flavored waters, enhanced waters, fruit juice and fruit juice flavored drinks, sport drinks and alcoholic drinks. The diet or reduced-calorie food products of the present invention can be selected from confections, dairy products, gelatins, puddings, cake mixes, cereals or cereal-based products or baked goods.

The present invention is further directed to methods of making diet or reduced-calorie beverages and food products which comprise including in a beverage or a food product a sugar alcohol, D-tagatose and, optionally, at least one nutritive sweetener.

The invention is also directed to a sweetener composition comprising a sugar alcohol, D-tagatose and, optionally, at least one nutritive sweetener.

DETAILED DESCRIPTION OF THE INVENTION

As used herein, "taste" refers to a combination of sweetness perception, temporal effects of sweetness perception, i.e., on-set and duration, off-tastes, e.g., bitterness and metallic taste, residual perception (aftertaste) and tactile perception, e.g., body and thickness. As used herein, "zero-calorie" means having less than 5 calories per serving, e.g., per 8 oz. for beverages. As used herein, "low-calorie" means having less than or equal to 40 calories per serving, e.g., per 8 oz. for beverages. As used herein, "diet" refers to either "zero-calorie" or "low-calorie." As used herein, "reduced calorie" means having a reduced number of calories as compared with a full-calorie counterpart; more particularly, "reduced calorie" typically means having at least a 25% reduction in calories per serving, e.g., per 8 oz. for beverages. In preferred embodiments, a "reduced calorie" beverage has a 25%, 30%, 35%, 40%, 45%, 50%, 55% or 60% reduction in calories per serving. While the term "reduced calorie" also encompasses "zero-calorie" and "low-calorie," a beverage may be a reduced calorie beverage without being a zero-calorie or low-calorie beverage.

The present invention is first directed to a method of improving the taste of reduced-calorie beverages and food products. According to the present invention, it is possible to achieve a reduced-calorie beverage or food product with a taste that is substantially similar or identical to that of a full-calorie beverage or food product. As a result of the present inventive method and, in particular, the combination of sweetener or sweetener blend, sugar alcohol and D-tagatose, overall sweetness, aftertaste duration, mouthfeel and sucrose-like quality of reduced-calorie foods and beverages are unexpectedly and advantageously improved.

According to the first embodiment of the present invention, the taste of a reduced-calorie beverage is improved by including in the beverage (a) at least one non-nutritive sweetener, (b) sugar alcohol and (c) D-tagatose. Beverages include, without limitation, carbonated soft drinks, fountain beverages, frozen ready-to-drink beverages, coffee beverages, tea beverages, powdered soft drinks, as well as liquid concentrates, flavored waters, enhanced waters, fruit juice and fruit juice flavored drinks, sport drinks and alcoholic products. The beverage may be carbonated or noncarbonated. In a preferred embodiment of the present invention, the beverage is a carbonated cola-flavored soft drink or a frozen carbonated beverage (FCB).

While it is believed that the combination of a single non-nutritive sweetener, a sugar alcohol and D-tagatose would lead to improved taste, it is also believed that the improvement is much more pronounced when using a blend of non-nutritive sweeteners. Therefore, a preferred embodiment of the present invention is directed to a method in which a blend of non-nutritive sweeteners is employed. The blend of non-nutritive sweeteners lends qualitative synergy to the taste of a low-calorie beverage in which it is included. Any blend of non-nutritive sweeteners can be employed in the present invention; two-, three-, four- and five-way blends of non-nutritive sweeteners are preferred.

Non-nutritive sweeteners suitable for use in the present invention include, without limitation, aspartame, acesulfame salts such as acesulfame-K, saccharins (e.g., sodium and calcium salts), cyclamates (e.g., sodium and calcium salts), sucralose, alitame, neotame, glycyrrhizin, steviosides, Lo Han Guo, neohesperidin dihydrochalcone, monatin, and protein sweeteners such as thaumatin, monellin and brazzein.

Steviosides include stevioside, rebaudioside A, rebaudioside C, dulcoside A, rubusoside, steviolbioside, and rebaudioside B. Steviosides are sometimes known as glycosides of steviol or stevia glycosides. Commercially, stevia glycosides are most often found in Stevia extract, which is obtained from the Stevia plant: *Stevia rebaudiana* (Bertoni) Bertoni of Compositae". Rubusoside can also be obtained from *Rubus suavissimus* S. Lee of Rosaceae. A typical stevia extract may contain about 50% to about 55% stevioside, about 20% to about 25% rebaudioside A, about 5% to about 10% rebaudioside C, and about 3 to about 5% dulcoside A. Stevia extract from stevia plants which produce more Rebaudioside A contain about 5% to about 14% stevioside, about 65% to about 72% rebaudioside A, about 3% to about 9% rebaudioside C, and about 0.6 to about 1.2% dulcoside A. Steviosides have a steviol backbone with glucose or rhamnose moieties typically. In certain embodiments the steviosides comprises a Stevia extract. In another embodiment, Stevia extract is about 5% to about 80% Stevioside, or greater than 80% Stevioside. In certain embodiments, the Stevia extract is about 20% to about 80% Rebaudioside A, 98% Rebaudioside A, or greater than 90% Rebaudioside A. In other embodiments, the Stevia extract comprises 1) 50-55% Stevioside, 20-25% Rebaudioside A, 5-10% Rebaudioside C, and 3-5% Dulcoside A; or 2)

5-14% Stevioside, 65-72% Rebaudioside A, 3-9% Rebaudioside C, and 0.6-1.2% Dulcoside A. Stevia extract can be purified to afford an array of sweeteners varied in the % purity of Rebaudioside A or Stevioside, and the present invention specifically contemplates the use of all such sweeteners comprising all percentages from 0 to 100 of Rebaudioside A and Stevioside and mixtures thereof.

Steviosides include those which have been extracted from nature and which have been modified. One such example of modified extract is Enzyme Modified Stevia Extract (also called Sugar-Transferred Stevia Extract), whose glycosides have additional glucose units through actions by enzymes such as cyclomaltodextrin glucanotransferase (CGTase). Stevia glycosides may also be synthesized. A formula for a transglucosylated derivative of a Stevia glycoside is the following:

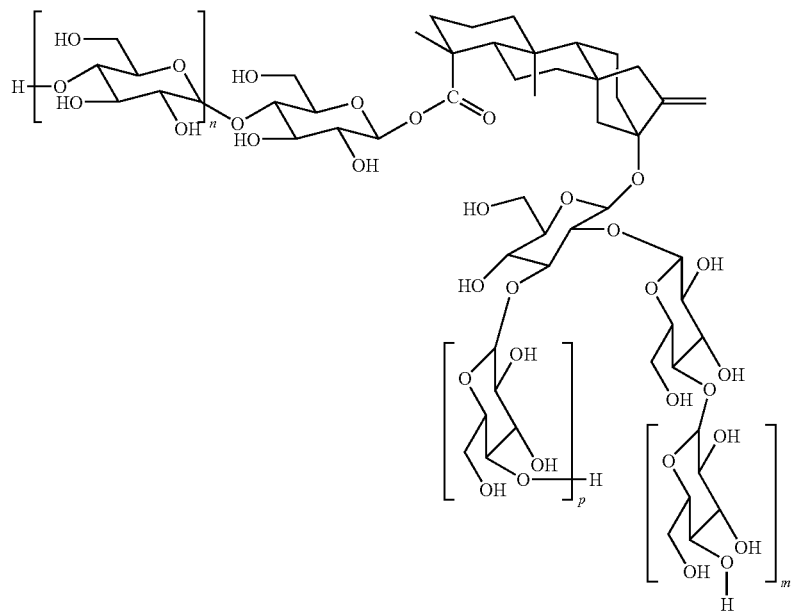

wherein m=2 to 5, n=0 to 2 and p=0 to 1.

The amount of steviosides to be used depends on the sweetness of the steviosides used and the amount of other sweeteners used. Typically, the amount is about 0.01% to about 0.2%, preferably 0.04% to 0.1%, and more preferably 0.05% to 0.09%, all by weight of the finished beverage.

Lo Han Guo is known in the art as a sweetening agent extracted from the Lo Han Guo plant (*Siraitia grosvenori* of Cucurbitaceae). Lo Han Guo, the sweetening agent, contains the following glycosides: Mogroside IV, Mogroside V, Siamenoside 1, 11-Oxo-mogroside V. Any one or a combination of the above glycosides from the Lo Han Guo plant may be used as a non-nutritive sweetener. In one embodiment, an extract from Lo Han Guo is used. Since Mogroside V is the sweetest component in Lo Han Guo, and it can be assayed via common HPLC method, the purity of Mogroside V is viewed as a key marker for the sweetness potency of a given Lo Han Guo extract. Commercially available Lo Han Guo extracts contain from about 2% to ≧30% Mogroside V. From the ≧30% Mogroside V material, ≧95% Mogroside V can be obtained. The amount of Lo Han Guo sweetening agent used in beverage depends on the Mogroside V content in the agent employed as well as the amount of other sweetener used.

Typically, to replace one third of the sweetener(s) in a regular beverage, the amount of Lo Han Guo extract containing about 2% Mogroside V is from 0.2% to 0.6%, preferably from 0.2% to 0.5%. If the Lo Han Guo extract used contains ≧30% Mogroside V, the amount used is from 0.01% to 0.06%; preferably from 0.03% to 0.05%. To replace all sweetener(s) in a regular beverage; thus, becoming a diet beverage, the amount of the Lo Han guo extract containing ≧30% Mogroside V used is from 0.1% to 0.3%; preferably from 0.15% to 0.25%. In certain embodiments, a Lo Han Guo extract is mixed with the steviosides described above, for example, a blend of an extract containing ≧30% Mogroside V and Rebaudioside A.

Another suitable non-nutritive sweetener is Miraculin. Miraculin is extracted from "Miracle fruit (from *Richardella dulcifica*)." Miraculin is a protein, which is not sweet per se, but upon contacting with an acid, it imparts a strong and lingering sweetness. Other suitable non-nutritive sweeteners include sweet proteins such as Brazzein (isolated from *Pentadiplandra brazzeana* Baillon), Thaumatin (isolated from *Thaumatococeus daniellii* (Bennet) Benth), Monellin (isolated from *Dioscoreophyllum cumminsii* (Stapf) Diels), and Mabinlins (isolated from *Capparis masakai* Levl).

Any sweetener, either natural or artificial, nutritive or non-nutritive can be employed in combination for present purposes. As used herein, a "non-nutritive" sweetener is one which does not provide significant caloric content in typical usage amounts, i.e., less than about 1 calorie per serving (8 oz. for beverages).

Preferred two-way blends include aspartame/acesulfame-K, sodium saccharin/sodium cyclamate, sucralose/acesulfame-K, Steviosides/Lo Han Guo extract, Stevia extract/Lo Han Guo extract, and Rebaudioside A/Lo Han Guo extract. Preferred three-way blends include aspartame/acesulfame-K/sodium saccharin, aspartame/acesulfame-K/sucralose, aspartame/acesulfame-K/sodium cyclamate, aspartame/sodium saccharin/sucralose, sucralose/sodium saccharin/sodium cyclamate and acesulfame-K/sodium cyclamate/sucralose. Preferred four-way blends include aspartame/acesulfame-K/sodium saccharin/sodium cyclamate, acesulfame-K/sodium saccharin/sodium cyclamate/sucralose, aspartame/acesulfame-K/sodium cyclamate/sucralose and aspartame/acesulfame-K/sodium saccharin/sucralose. Preferred five-way blends include aspartame/acesulfame-K/sodium saccharin/sodium cyclamate/sucralose.

One of ordinary skill in this art will readily appreciate that non-nutritive sweeteners may be combined in various ratios to form a non-nutritive sweetener blend suitable for use in the present invention. Precise ratios of non-nutritive sweeteners depend on the combination of sweeteners used in a given blend and the desired overall sweetness for a given application. Appropriate ratios can be readily determined by one of ordinary skill in this art.

Any nutritive sweetener is suitable for use; as used herein, a "nutritive" sweetener is one which provides significant caloric content in typical usage amounts, i.e., more than about 1 calorie per serving (8 oz. for beverages). Suitable nutritive sweeteners include, without limitation, fructose, sucrose, dextrose, maltose, trehalose, rhamnose, corn syrups and fructo-oligosaccharides. One of ordinary skill in this art will readily appreciate that nutritive sweeteners may be combined in various ratios to form a nutritive sweetener blend suitable for use in the present invention. Precise ratios of nutritive sweeteners depend on the combination of sweeteners used in a given blend and the desired overall sweetness for a given application. Appropriate ratios can be readily determined by one of ordinary skill in this art. Furthermore, blends of nutritive and non-nutritive sweeteners are suitable for use in the present invention, preferably in combination with stevia extract and/or Lo Han Guo extract, e.g., steviosides, enzyme modified steviosides, stevioside, rebaudioside A, rebaudioside C, dulcoside A, rubusoside, steviolbioside, rebaudioside B, Mogroside IV, Mogroside V, Siamenoside 1, 11-Oxo-mogroside V.

One of ordinary skill in this art will readily appreciate that the amount of the nutritive sweetener or blend of nutritive sweeteners or blend of non-nutritive sweeteners, or blend of nutritive and non-nutritive sweeteners in a finished beverage will vary depending on a variety of factors such as the desired overall sweetness for a given application. Appropriate amounts can be readily determined by one of ordinary skill in this art.

In addition to the non-nutritive sweetener or sweetener blend, a sugar alcohol is included in a reduced-calorie beverage in order to improve the overall taste. Sugar alcohol blocks the lingering sweetness and the bitter/metallic aftertaste associated with the use of non-nutritive sweeteners. Sugar alcohols suitable for use in the present invention include, without limitation, sorbitol, mannitol, lactitol, maltitol, xylitol, erythritol and combinations thereof. Typically, the sugar alcohol is included in an amount from about 0.1% to 3.5% of the finished beverage by weight. Erythritol, i.e., meso-erythritol, is especially preferred for use in the present invention. Typically, erythritol is included in an amount from about 0.1% to 3.5% of the finished beverage by weight, preferably from about 0.2% to 2.5% of the finished beverage by weight. In some applications, more than 2% or preferably about 2.5% to about 3.5% erythritol is used, all by weight of the finished beverage. In certain embodiments, 1.5% to 2.5%, 1.75% to 2.15%, 1.75%, 2.13% or 2.14% is used.

D-tagatose is also included in the reduced-calorie beverage in order to improve the overall taste. The use of D-tagatose enhances mouthfeel (also referred to as body, thickness or delocalization of sweetness). D-tagatose is included in an amount from about 0.1% to 1.0% of the finished beverage by weight, preferably 0.2% to 0.9% of the finished beverage by weight, and most preferably 0.3% to 0.6% of the finished beverage by weight. In some applications, about 0.6% to about 1.0%, about 0.8% to about 1.0%, and about 0.9% tagatose by weight is utilized, all by weight of the finished beverage. In certain embodiments, 0.2% to 0.4%, 0.25 to 0.32%, 0.25%, or 0.32% D-tagatose erythritol is used.

In certain embodiments, erythritol and D-tagatose are used in combination. In various embodiments, 1.75% erythritol and 0.32% D-tagatose are used, or 2.14% erythritol and 0.25% D-tagatose are used. In general, increasing the amount of D-tagatose allows for a decrease in the amount of erythritol without adversely effecting the flavor, and increasing the amount of erythritol allows for a decrease in the amount of D-tagatose without adversely effecting the flavor. Other combinations of erythritol and D-tagatose include:

| D-tagatose | Erythritol |
| --- | --- |
| >0.75% to 1% | 1.5% to 3.5% |
| (e.g., 0.8%, 0.9% or 1%) | (e.g., 1.5%, 1.75%, 2%, 3% or 3.5%) |
| >0.5% to 0.75% | 1.6% to 3.5% |
| (e.g., 0.6%, 0.7% or 0.75%) | (e.g., 1.6%, 1.7%, 1.75%, 2%, 3% or 3.5%) |
| >0.25% to 0.5% | 1.75% to 3.5% |
| (e.g., 0.3%, 0.32%, 0.4% or 0.5%) | (e.g., 1.75%, 2%, 3% or 3.5%) |
| 0.2% to 0.25% | 2.13% to 3.5% |
| (e.g., 0.2%, 0.23% or 0.25%) | (e.g., 2.13%, 2.14%, 3% or 3.5%) |

The non-nutritive sweetener or sweetener blend provides no appreciative caloric content to a reduced-calorie beverage. Based on the use level of both the sugar alcohol and the D-tagatose in the present invention, use of these ingredients does not have a significant impact on the total caloric content of a beverage sweetened as set forth in the present invention. For example, erythritol, a 4-carbon sugar alcohol is reported to generate almost no calories (0.2 calorie/g). D-tagatose is reported to impart about 1.5 calories/g. It should be noted that both erythritol and D-tagatose do impart a certain degree of sweetness to the overall beverage.

Another embodiment of the present invention is directed to improving the taste of a reduced-calorie food product by including in the food product (a) at least one non-nutritive sweetener, (b) a sugar alcohol and (c) D-tagatose. Again, a preferred embodiment contemplates the use of a blend of non-nutritive sweeteners. Such food products include, without limitation, confections, dairy products, gelatins, puddings, cake mixes, cereals and cereal-based products and baked goods. In a preferred embodiment of the present invention, the food product is a gelatin dessert. All of the above discussion related to the inclusion of a non-nutritive sweetener blend, erythritol and D-tagatose in a reduced-calorie beverage is applicable to reduced-calorie food products.

Additional embodiments of the present invention are directed to reduced-calorie beverages and food products which include (a) at least one and preferably a blend of non-nutritive sweeteners, (b) a sugar alcohol and (c) D-tagatose as set forth above. A preferred embodiment is directed to a reduced-calorie frozen carbonated beverage (FCB). Yet another embodiment is directed to a method of making such a FCB.

Another embodiment of the present invention is directed to a sweetener composition comprising (a) at least one and preferably a blend of non-nutritive sweeteners, (b) a sugar alcohol and (c) D-tagatose as set forth above.

Another embodiment of the present invention is directed to a reduced calorie beverage syrup or concentrate. The syrup is formulated so that upon suitable dilution the resulting finished beverage has sugar alcohol, tagatose and a non-nutritive sweetener in suitable amounts. Typical dilution ratios are 1 part syrup to approximately 3 to 5 parts water or more, for example. The syrup may be used in making a FCB or non-frozen beverages.

It is possible to include any other ingredients typically used in reduced-calorie beverages and food products in appropriate amounts in the reduced-calorie beverages and food products of the present invention. For example, in the reduced-calorie frozen carbonated beverages of the present invention, it is possible to include other ingredients typically found in such beverages. Such other ingredients include, without limitation, acidulants, flavors, soluble low-calorie fibers such as polydextrose, Fibersol®, arabinogalactan, chitosan, chitin, xanthan, pectin, cellulosics, konjac, gum arabic, modified starch, soy fiber, inulin, inulose, hydrolyzed guar, guar gum, beta-glucan, carageenan, locust bean gum, alginate, polyglycol alginate, foam stabilizing agents such as yucca or yucca/quillaia extracts, salts such as sodium, calcium and potassium chlorides, food grade surfactants such as monoglycerides, diglycerides, lecithin and fractions thereof, and synthetic surfactants such as Tweens®, Spans®, diacetyltartaric esters, citric acid esters, etc.

It is additionally possible to include in a beverage or food product, a combination of at least one non-nutritive sweetener, a sugar alcohol, D-tagatose and at least one nutritive sweetener in order to achieve good tasting, diet or reduced calorie beverages or food products. Any nutritive sweetener is suitable for use; as used herein, a "nutritive" sweetener is one which provides significant caloric content in typical usage amounts, i.e., more than about 4 calories per gram of dry weight. Such sweeteners include, without limitation, fructose, sucrose, dextrose, maltose, trehalose, rhamnose, corn syrups and fructo-oligosaccharides. All of the above discussion related to the inclusion of a non-nutritive sweetener blend, erythritol and D-tagatose in a reduced calorie beverage or food product is applicable to diet beverage and food products.

The examples which follow are intended as an illustration of certain preferred embodiments of the invention, and no limitation of the invention is implied.

EXAMPLE 1

A 2-liter syrup for use in making a finished cola drink was prepared. The ingredients listed in Table 1 were added in sequence to approximately 1-1.5 L purified water with stirring.

TABLE 1

| Ingredient | (g) |
| --- | --- |
| sodium benzoate | 2.04 |
| phosphoric acid | 4.41 |
| caffeine | 1.27 |
| citric acid | 1.63 |
| cola flavors | 38.63 |
| aspartame | 1.63 |
| acesulfame-K | 0.528 |
| sodium saccharin | 0.42 |
| sodium cyclamate | 4.2 |
| erythritol | 24.0 |
| D-tagatose | 48.0 |

Purified water was added until the syrup was 2 liters in volume. Then, 50 mL portions of the syrup were added respectively to 250 mL portions of carbonated water, i.e., a one-plus-five "throw", to obtain finished cola drinks. The drinks were sealed, shaken several times and aged in a temperature-controlled (90° F.) room. Drinks were pulled at regular intervals and evaluated by a panel of experts in cola taste. Drinks made according to this example were judged as providing a taste extremely close to that of a regular or full-calorie cola drink control.

EXAMPLE 2

A 2-liter syrup for use in making a finished cola drink was prepared. The ingredients listed in Table 2 were added in sequence to approximately 1-1.5 L purified water with stirring.

TABLE 2

| ingredient | (g) |
| --- | --- |
| sodium benzoate | 2.04 |
| phosphoric acid | 4.41 |
| caffeine | 1.27 |
| citric acid | 1.63 |
| cola flavors | 38.63 |
| aspartame | 2.72 |
| acesulfame-K | 0.66 |
| sodium saccharin | 0.468 |
| erythritol | 26.4 |
| D-tagatose | 52.8 |

Purified water was added until the syrup was 2 liters in volume. Then, 50 mL portions of the syrup were added respectively to 250 mL portions of carbonated water, i.e., a one-plus-five "throw", to obtain finished cola drinks. The drinks were sealed, shaken several times and aged in a temperature-controlled (90° F.) room. Drinks were pulled at regular intervals and evaluated by a panel of experts in cola taste. Drinks made according to this example were judged as providing a taste extremely close to that of a regular or full-calorie cola drink control.

EXAMPLE 3

A 2-liter syrup for use in making a finished cola drink was prepared. The ingredients listed in Table 3 were added in sequence to approximately 1-1.5 L purified water with stirring.

TABLE 3

| ingredient | (g) |
| --- | --- |
| Sodium benzoate | 2.04 |
| phosphoric acid | 4.41 |
| caffeine | 1.27 |
| citric acid | 1.63 |
| Cola flavors | 38.63 |
| acesulfame-K | 1.836 |
| Sodium cyclamate | 4.488 |
| Sodium saccharin | 0.912 |
| sucralose | 0.516 |
| erythritol | 24.0 |
| D-tagatose | 48.0 |

Purified water was added until the syrup was 2 liters in volume. Then, 50 mL portions of the syrup were added respectively to 250 mL portions of carbonated water, i.e., a five-plus-one "throw", to obtain finished cola drinks. The drinks were sealed, shaken several times and aged at room temperature for 4 weeks. Drinks were evaluated by trained panelists. Drinks made according to this example exhibited no statistical differences as compared to a full-calorie cola with respect to sweetness, mouthfeel and cola flavor.

EXAMPLE 4

Cola drinks were prepared in the same manner as in Example 1 except insofar as a five-way blend of aspartame/acesulfame-K/sodium saccharin/sodium cyclamate/sucralose was used. Sodium saccharin was included in an amount from 30-40 ppm, e.g., 35 ppm, in the finished cola drinks. The ratio of aspartame/acesulfame-K/sodium saccharin/sodium cyclamate/sucralose, with the amount of sodium saccharin being one, was 2.50-3.0:1.0-1.5:1:4.0-8.0:0.3-0.8. Drinks made according to this example were judged as providing a taste extremely close to that of a regular or full-calorie cola drink control.

EXAMPLE 5

Cola drinks were prepared in the same manner as in Example 1 except insofar as a four-way blend of aspartame/acesulfame-K/sodium saccharin/sodium cyclamate was used. Sodium saccharin was included in an amount from 30-40 ppm, e.g., 35 ppm, in the finished cola drinks. The ratio of aspartame/acesulfame-K/sodium saccharin/sodium cyclamate, with the amount of sodium saccharin being one, was 3.25-4.25:1.00-1.50:1:8-11 . Drinks made according to this example were judged as providing a taste extremely close to that of a regular or fall-calorie cola drink control.

EXAMPLE 6

Cola drinks were prepared in the same manner as in Example 1 exceptinsofar as a four-way blend of acesulfame-K/sodium saccharin/sodium cyclamate/sucralose was used. Sodium saccharin was included in an amount from 70-80 ppm, e.g., 75 ppm, in the finished cola drinks. The ratio of acesulfame-K/sodium saccharin/sodium cyclamate/sucralose, with the amount of sodium saccharin being one, was 1.5-2.5:1:4.0-6.0:0.4-0.8 . Drinks made according to this example were judged as providing a taste extremely close to that of a regular or full-calorie cola drink control.

EXAMPLE 7

Cola drinks were prepared in the same manner as in Example 1 except insofar as a four-way blend of aspartame/acesulfame-K/sodium saccharin/sucralose was used. Sodium saccharin was included in an amount from 25-45 ppm, e.g., 35 ppm, in the finished cola drinks. The ratio of aspartame/acesulfame-K/sodium saccharin/sucralose, with the amount of sodium saccharin being one, was 3.7-4.1:1.2-1.7:1:0.4-0.8 . Drinks made according to this example were judged as providing a taste extremely close to that of a regular or full-calorie cola drink control.

EXAMPLE 8

Cola drinks were prepared in the same manner as in Example 1 except insofar as a three-way blend of aspartame/acesulfame-K/sodium saccharin was used. Sodium saccharin was included in an amount from 35-45 ppm, e.g., 40 ppm, in the finished cola drinks. The ratio of aspartame/acesulfame-K/sodium saccharin, with the amount of sodium saccharin being one, was 5.25-6.05:1.25-1.55:1 . Drinks made according to this example were judged as providing a taste extremely close to that of a regular or full-calorie cola drink control.

EXAMPLE 9

Cola drinks were prepared in the same manner as in Example 1 except insofar as a three-way blend of aspartame/acesulfame-K/sucralose was used. Sucralose was included in an amount from 45-55 ppm, e.g., 50 ppm, in the finished cola drinks. The ratio of aspartame/acesulfame-K/sucralose, with the amount of sucralose being one, was 1.8-2.8:1.2-1.5:1 . Drinks made according to this example were judged as providing a taste extremely close to that of a regular or full-calorie cola drink control.

EXAMPLE 10

Cola drinks were prepared in the same manner as in Example 1 except insofar as a three-way blend of aspartame/acesulfame-K/sodium cyclamate was used. Acesulfame-K was included in an amount from 40-70 ppm, e.g., 55 ppm, in the finished cola drinks. The ratio of aspartame/acesulfame-K/sodium cyclamate, with the amount of acesulfame-K being one, was 3.5-4.5:1:6.0-8.0 . Drinks made according to this example were judged as providing a taste extremely close to that of a regular or full-calorie cola drink control.

EXAMPLE 11

Cola drinks were prepared in the same manner as in Example 1 except insofar as a three-way blend of acesulfame-K/sodium saccharin/sucralose was used. Sodium saccharin was included in an amount from 35-75 ppm, e.g., 40 ppm, in the finished cola drinks. The ratio of acesulfame-K/sodium saccharin/sucralose, with the amount of sodium saccharin being one, was 1.0-2.5:1:1.5-2.5 . Drinks made according to this example were judged as providing a taste extremely close to that of a regular or full-calorie cola drink control.

EXAMPLE 12

Cola drinks were prepared in the same manner as in Example 1 except insofar as a three-way blend of acesulfame-K/sodium saccharin/sodium cyclamate was used. Sodium saccharin was included in an amount from 45-60 ppm, e.g., 55 ppm, in the finished cola drinks. The ratio of acesulfame-K/sodium saccharin/sodium cyclamate, with the amount of sodium saccharin being one, was 1.5-2.5:1:6.0-8.0. Drinks made according to this example were judged as providing a taste extremely close to that of a regular or full-calorie cola drink control.

EXAMPLE 13

Cola drinks were prepared in the same manner as in Example 1 except insofar as a two-way blend of aspartame/acesulfame-K was used. Aspartame was included in an amount of about 300 ppm, while acesulfame-K was included in an amount of about 95 ppm in the finished cola drinks. Drinks made according to this example were judged as providing a taste extremely close to that of a regular or full-calorie cola drink control.

EXAMPLE 14

Cola drinks were prepared in the same manner as in Example 1 except insofar as a two-way blend of sodium saccharin/sodium cyclamate was used. Sodium saccharin and sodium cyclamate were included in a ratio of about 1:10 in the finished cola drinks. Drinks made according to this example were judged as providing a taste extremely close to that of a regular or full-calorie cola drink control.

EXAMPLE 15

Cola drinks were prepared in the same manner as in Example 1 except insofar as a two-way blend of sucralose/acesulfame-K was used. Sucralose was included in an amount of about 160 ppm, while acesulfame-K was included in an amount of about 122 ppm in the finished cola drinks. Drinks made according to this example were judged as providing a taste extremely close to that of a regular or full-calorie cola drink control.

COMPARATIVE EXAMPLES 1A-1C

Cola drinks were prepared in the same manner as in Example 1, except insofar as erythritol (1A), D-tagatose (1B), and both erythritol and D-tagatose (1C) were omitted, respectively. Drinks were evaluated by a panel of experts in cola taste. Drinks made according to these comparative examples were judged as failing to provide a taste extremely close to that of a regular or full-calorie cola drink control, i.e., the drinks exhibited "diet taste".

COMPATATIVE EXAMPLES 2A-2C

Cola drinks were prepared in the same manner as in Example 2, except insofar as erythritol (2A), D-tagatose (2B), and both erythritol and D-tagatose (2C) were omitted, respectively. Drinks were evaluated by a panel of experts in cola taste. Drinks made according to these comparative examples were judged as failing to provide a taste extremely close to that of a regular or full-calorie cola drink control, i.e., the drinks exhibited "diet taste".

COMPATATIVE EXAMPLES 3A-3C

Cola drinks were prepared in the same manner as in Example 3, except insofar as erythritol (3A), D-tagatose (3B), and both erythritol and D-tagatose (3C) were omitted, respectively. Drinks were evaluated by a panel of experts in cola taste. Drinks made according to these comparative examples were judged as failing to provide a taste extremely close to that of a regular or full-calorie cola drink control, i.e., the drinks exhibited "diet taste".

EXAMPLE 16

To a gallon of unsweetened Diet Mountain Dew® base, erythritol (2.5% by weight of finished drink) and D-tagatose (0.9% by weight of finished drink) were added, and the solution was stirred until complete dissolution occurred. Aspartame (400 ppm per finished drink) was then added, and again the solution was stirred until complete dissolution. The syrup thus prepared was placed into a frozen carbonated beverage machine (Cornelius, V3, Wisconsin) in a 1 plus 5 throw (1 part syrup with 5 parts carbonated water). The resulting FCB has good carbon dioxide overrun, smooth, creamy mouthfeel and great taste. In addition, the syrup can be successively run through the FCB machine to consistently achieve a high quality FCB.

EXAMPLE 17

To a gallon of unsweetened Diet Mountain Dew® base, erythritol (2.5% by weight of finished drink) and D-tagatose (0.9% by weight of finished drink) were added, and the solution was stirred until complete dissolution occurred. Acesulfame-K (60 ppm per finished drink) and sucralose (60 ppm per finished drink) were then added, and again the solution was stirred until complete dissolution. The syrup thus prepared was placed into a frozen carbonated beverage machine (Cornelius, V3, Wisconsin) in a 1 plus 5 throw (1 part syrup with 5 parts carbonated water). The resulting FCB has good carbon dioxide overrun, smooth, creamy mouthfeel and great taste. In addition, the syrup can be successively run through the FCB machine to consistently achieve a high quality FCB.

COMPATATIVE EXAMPLE 4

To a gallon of unsweetened Diet Mountain Dew® base, erythritol (3.4% by weight of finished drink) was added, and the solution was stirred until complete dissolution occurred. Aspartame (400 ppm per finished drink) was then added, and again the solution was stirred until complete dissolution. The syrup thus prepared was placed into a frozen carbonated beverage machine (Cornelius, V3, Wisconsin) in a 1 plus 5 throw (1 part syrup with 5 parts carbonated water). The resulting FCB has good carbon dioxide overrun, mouthfeel and taste. However, a good quality FCB is not consistently achieved upon successive run through of the syrup thus prepared; after a second or third run through, the nozzle chamber freezes and/or other problems arise which prevent FCB from being dispensed from the FCB machine.

EXAMPLE 18

A frozen carbonated beverage was prepared in the same manner as in Example 17 except insofar as 2.0% fructose based on finished beverage weight was also included in the FCB. Drinks made according to this example were judged as providing a taste extremely close to that of a regular or full-calore FCB control.

EXAMPLE 19

Erythritol (3% or 30 g per 1 L) and D-tagatose (0.9% or 9 g per 1 L) were dissolved in 0.9 L Aquafina® water. Sodium citrate (0.113 g) and citric acid (0.13 g) were added to the solution. Additional water was added to make 1 L finished beverage. A good tasting, naturally sweetened, low-calorie water was obtained.

EXAMPLE 20

Erythritol (3% or 30 g per 1 L) and D-tagatose (0.9% or 9 g per 1 L) were dissolved in 0.9 L Aquafina® water. Sodium citrate (0.113 g), citric acid (0.13 g) and 0.2% fruit flavor (based on finished beverage weight) were added to the solution. Additional water was added to make 1 L finished beverage. A good tasting, naturally sweetened, low-calorie, fruit flavored water was obtained.

EXAMPLE 21

Erythritol (3% or 30 g per 1 L) and D-tagatose (0.9% or 9 g per 1 L) were dissolved in 0.9 L Aquafina® water. Sodium citrate (0.113 g), citric acid (0.13 g), 0.2% fruit flavor (based on finished beverage weight) and fructose (0.29% or 2.9 g per 1 L) were added to the solution. Additional water was added to make 1 L finished beverage. A good tasting, naturally sweetened, low-calorie (10 calories per 8 oz.), fruit flavored sport drink was obtained. The level of sweetness of the drink was the same or more than that of a sport drink made with only high fructose corn syrup (35 calories per 8 oz.).

EXAMPLE 22

Forty percent of the high fructose corn syrup of an 11 Brix cola beverage was replaced with a 2% erythritol/0.9%

D-tagatose blend. A reduced-calorie, naturally sweetened cola beverage having the same sweetness and taste as its full-calorie counterpart was obtained.

EXAMPLE 23

Erythritol (3% or 30 g per 1 L) and D-tagatose (0.9% or 9 g per 1 L) were dissolved in 0.9 L Aquafina® water. Sodium citrate (0.113 g), citric acid (0.13 g), 0.2% fruit flavor (based on finished beverage weight), vitamin B complex (10% recommended daily value based on finished beverage) and fructose (0.29% or 2.9 g per 1 L) were added to the solution. Additional water was added to make 1 L finished beverage. A good tasting, naturally sweetened, low-calorie (10 calories per 8 oz.), fruit flavored sport drink was obtained. The level of sweetness of the drink was the same or more than that of a sport drink made with only high fructose corn syrup (35 calories per 8 oz.).

EXAMPLE 24

To a gallon of unsweetened Diet Mountain Dew® base, erythritol (2% by weight of finished drink) and D-tagatose (0.9% by weight of finished drink) were added, and the solution was stirred until complete dissolution occurred. Fructose (3.6% based on weight of finished drink) was then added, and again the solution was stirred until complete dissolution. The syrup thus prepared was placed into a frozen carbonated beverage machine (Cornelius, V3, Wis.) in a 1 plus 5 throw (1 part syrup with 5 parts carbonated water). The resulting naturally sweetened, low-calorie FCB has good carbon dioxide overrun, smooth, creamy mouthfeel and great taste. In addition, the syrup can be successively run through the FCB machine to consistently achieve a high quality FCB.

EXAMPLE 25

A 1-liter syrup for use in making a finished diet cola drink was prepared. Erythritol and tagatose were dissolved in approximately 0.5 L purified warm water (about 120° F.). Afterward, the remaining ingredients listed in the following table were added in sequence with stirring.

TABLE 4

| Ingredient | (g) |
| --- | --- |
| erythritol | 210.0 |
| tagatose | 60.0 |
| sodium benzoate | 1.03 |
| sodium citrate | 0.63 |
| EDTA | 0.18 |
| phosphoric acid 80% | 2.31 |
| caffeine | 0.48 |
| citric acid | 0.42 |
| cola flavor | 17.6 |
| antifoam | 1.11 |
| Rebaudioside A | 3.0 |

Purified water was added until the syrup was 1 liter in volume. Then 50 mL portions of the syrup were added respectively to 250 mL portions of carbonated water, i.e., a one-plus-five "throw", to obtain finished cola drinks. The drinks were sealed, shaken several times and aged in a temperature-controlled (90° F.) room. The resulting drink comprised 3.5% erythritol, 1% D-tagatose and 0.05% rebaudioside A. Drinks were pulled at regular intervals and evaluated by a panel of experts in cola taste. Drinks made according to this example were judged as providing a good taste similar to that of a commercial cola sweetened by high fructose corn syrup, and is extremely close to a commercial diet cola sweetened by aspartame.

EXAMPLE 26

A 1-liter syrup for use in making a finished diet cola drink was prepared. Erythritol and tagatose were dissolved in approximately 0.5 L purified warm water (about 120° F.). Afterward, the remaining ingredients listed in the following table were added in sequence with stirring.

TABLE 5

| Ingredient | (g) |
| --- | --- |
| erythritol | 128.0 |
| tagatose | 15.0 |
| sodium benzoate | 1.03 |
| sodium citrate | 0.63 |
| EDTA | 0.18 |
| phosphoric acid 80% | 2.31 |
| caffeine | 0.48 |
| citric acid | 0.42 |
| cola flavor | 17.6 |
| antifoam | 1.11 |
| Rebaudioside A | 3.6 |

Purified water was added until the syrup was 1 liter in volume. Then 50 mL portions of the syrup were added respectively to 250 mL portions of carbonated water, i.e., a one-plus-five "throw", to obtain finished cola drinks. The drinks were sealed, shaken several times and aged in a temperature-controlled (90° F.) room. The resulting drink comprised 2.13% erythritol, 0.25% D-tagatose and 0.06% rebaudioside A. Drinks were pulled at regular intervals and evaluated by a panel of experts in cola taste. Drinks made according to this example were judged as providing a good sweet taste similar to that of a commercial diet cola sweetened by aspartame.

EXAMPLE 27

A 1-liter syrup for use in making a finished diet cola drink was prepared. Erythritol and tagatose were dissolved in approximately 0.5 L purified warm water (about 120° F.). Afterward, the remaining ingredients listed in the following table were added in sequence with stirring.

TABLE 6

| Ingredient | (g) |
| --- | --- |
| erythritol | 210.0 |
| tagatose | 60.0 |
| sodium benzoate | 1.03 |
| sodium citrate | 0.63 |
| EDTA | 0.18 |
| phosphoric acid 80% | 2.31 |
| caffeine | 0.48 |
| citric acid | 0.42 |
| cola flavor | 17.6 |
| antifoam | 1.11 |
| Mogroside V (>95%) | 3.0 |

Purified water was added until the syrup was 1 liter in volume. Then 50 mL portions of the syrup were added respectively to 250 mL portions of carbonated water, i.e., a one-plus-five "throw", to obtain finished cola drinks. The drinks were sealed, shaken several times and aged in a temperature-controlled (90° F.) room. The resulting drink comprised 3.5% erythritol, 1% D-tagatose and 0.05 mogroside V. Drinks were pulled at regular intervals and evaluated by a panel of experts in cola taste. Drinks made according to this example were judged as providing a good sweet taste similar to that of a commercial diet cola sweetened by aspartame.

One skilled in the art will appreciate that the foregoing Examples may be reformulated within the spirit of the invention. For example, stevia glycosides, derivatives of a stevia glycosides, Lo Han Guo extract and mixtures thereof may be used in addition to or as a substitute for a nutritive or non-nutritive sweetener.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

We claim:

1. A reduced calorie beverage comprising (a) a non-nutritive sweetener comprising one or more steviosides in an amount of about 0.01% to about 0.2% based on finished beverage weight; (b) erythritol in an amount of about 0.1% to about 3.5% based on finished beverage weight; and (c) D-tagatose in an amount of about 0.1% to about 1.0% based on finished beverage weight.

2. The reduced calorie beverage of claim 1, wherein the non-nutritive sweetener comprises Rebaudioside A.

3. The reduced calorie beverage of claim 1, wherein the non-nutritive sweetener comprises a Stevia extract.

4. The reduced calorie beverage of claim 1, wherein the non-nutritive sweetener comprises an enzyme modified Stevia extract.

5. The reduced calorie beverage of claim 1, wherein the non-nutritive sweetener comprises a transglucosylation derivative of a Stevia glycoside.

6. The reduced calorie beverage of claim 1, wherein the non-nutritive sweetener comprises a transglucosylation derivative of a Stevia glycoside having the formula:

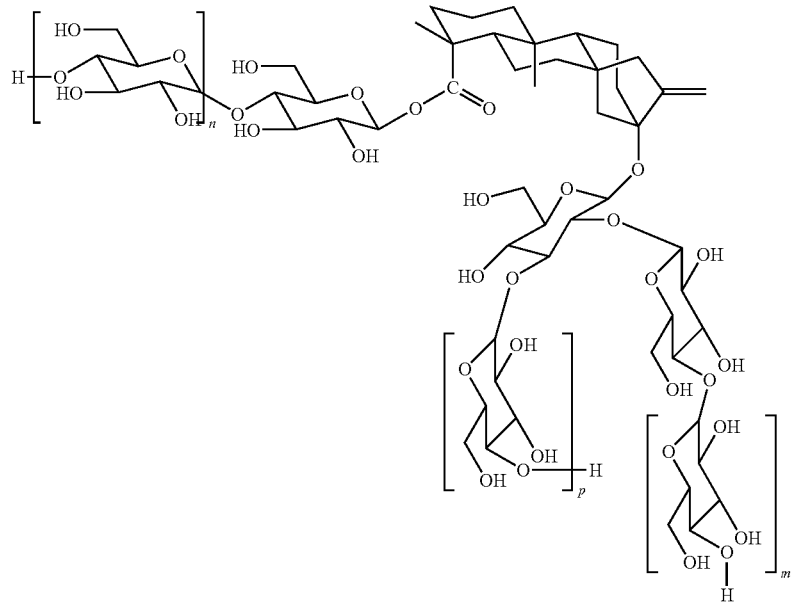

wherein m=2 to 5, n=0 to 2 and p=0 to 1.

7. The reduced calorie beverage of claim 1, wherein the non-nutritive sweetener is selected from the group consisting of Stevioside and Rebaudioside A.

8. The reduced calorie beverage of claim 7, wherein the Stevioside is 5% to about 80% Stevioside, or greater than 80% Stevioside, and wherein the Rebaudioside A is about about 20% to about 80% Rebaudioside A, greater than 90% Rebaudioside A, or 98% Rebaudioside A.

9. The reduced calorie beverage of claim 1, wherein the beverage does not have a noticeable off-taste.

10. The reduced calorie beverage of claim 1, wherein said one or more steviosides is selected from the group consisting of Stevioside, Rebaudioside A, Rebaudioside C, Dulcoside A, Rubusoside, Steviolbioside, Rebaudioside B and combinations thereof.

11. The reduced calorie beverage according to claim 1, wherein said beverage is selected from the group consisting of soft drinks, fountain beverages, frozen ready-to-drink beverages, coffee beverages, tea beverages, powdered soft drinks, liquid concentrates, flavored waters, enhanced waters, fruit juice and fruit juice flavored drinks, sport drinks and alcoholic drinks.

12. The reduced calorie beverage according to claim 10, wherein said beverage is a soft drink selected from the group consisting of cola and lemon-lime soft drinks.

13. The reduced calorie beverage according to claim 1, having a calorie content of less than 5 calories per 8 oz serving of the beverage.

14. The reduced calorie beverage according to claim 1, having a calorie content of less than 40 calories per 8 oz serving of the beverage.

15. A reduced calorie beverage comprising (a) a non-nutritive sweetener comprising a Lo Han Guo extract comprising at least 30% Mogroside V in an amount of 0.1% to 0.3% based on finished beverage weight; (b) erythritol in an amount of about 0.1% to about 3.5% based on finished beverage weight; and (c) D-tagatose in an amount of about 0.1% to about 1.0% based on finished beverage weight.

16. The reduced calorie beverage of claim 15, wherein the Lo Han Guo extract further comprises Mogroside IV, Siamenoside 1, or 11-Oxo-mogroside V.

17. The reduced calorie beverage of claim 15, wherein the Lo Han Guo extract comprises at least 95% Mogroside V.

18. The reduced calorie beverage of claim 15, wherein the beverage does not have a noticeable off-taste.

19. The reduced calorie beverage according to claim 15, wherein said beverage is selected from the group consisting of soft drinks, fountain beverages, frozen ready-to-drink beverages, coffee beverages, tea beverages, powdered soft drinks, liquid concentrates, flavored waters, enhanced waters, fruit juice and fruit juice flavored drinks, sport drinks and alcoholic drinks.

20. The reduced calorie beverage according to claim 19, wherein said beverage is a soft drink selected from the group consisting of cola and lemon-lime soft drinks.

21. The reduced calorie beverage according to claim 15, having a calorie content of less than 5 calories per 8 oz serving of the beverage.

22. The reduced calorie beverage according to claim 15, having a calorie content of less than 40 calories per 8 oz serving of the beverage.

23. A reduced calorie beverage syrup or concentrate comprising (a) a non-nutritive sweetener comprising one or more steviosides, a Lo Han Guo extract comprising at least 30% Mozroside V, or mixtures thereof; (b) erythritol; and (c) D-tagatose; wherein the erythritol and D-tagatose are present in amounts such that when diluted to form a beverage, the erythritol is present in an amount of about 0.1% to about 3.5% based on finished beverage weight; and the D-tagatose in an amount of about 0.1% to about 1.0% based on finished beverage weight, and if present. the one or steviosides are present in an amount of about 0.01% to about 0.2% based on finished beverage weight, and the Lo Han Guo is present in an amount of 0.1% to 0.3% based on finished beverage weight.

* * * * *